Feb. 7, 1939.  L. E. W. VAN ALBADA  2,146,662

SIGHTING INSTRUMENT

Filed Sept. 5, 1936

Inventor:
L. E. W. Van Albada

Patented Feb. 7, 1939

2,146,662

UNITED STATES PATENT OFFICE 2,146,662

SIGHTING INSTRUMENT

Lieuwe E. W. Van Albada, Bloemendaal, Netherlands

Application September 5, 1936, Serial No. 99,669

2 Claims. (Cl. 88—32)

The present invention concerns instruments to provide a wide view through a narrow aperture in the wall of a room, at some distance from the aperture, and to determine the location of objects outside.

For the proper understanding of the present invention some definitions and distinguishments may be mentioned.

Under "objective" are understood those parts of the concerned optical instruments, that form the first real, reversed image of distant objects behind the objective.

A sighting objective distinguishes itself from the well-known telescopic and photographic objectives, hitherto also used for sighting purposes, by the fact, that the main or central rays of the issuing raypencils converge towards a point of the axis instead of diverging from it. Whilst the main rays issuing from objectives of the telescopic and photographic types keep the same direction as before entering them, the main rays of a sighting objective are refracted convergently at every surface they pass in order to reach the axis of the system.

This convergence enables the eye, when placed in or near the axis, not far behind the objective, to survey the image of a considerable field of view, as a whole, against the rear lens of the objective.

The pupil of the eye, being the real working exit pupil of a sighting instrument, is imaged by rays passing in the reversed course through the instrument in or near its objective.

This image, the real working entrance pupil of the instrument must find its place in the optical center of the telescopic or in the stop of the photographic objective, when used for sighting purposes, but, when a sighting objective is used, generally at some distance before the front lens, in the open air.

For objectives of the photographic or telescopic type this must be effectuated principally by an additional collective lens, but in case of a sighting objective, its lenses alone bring the real working entrance pupil on its right place.

Figure 1:
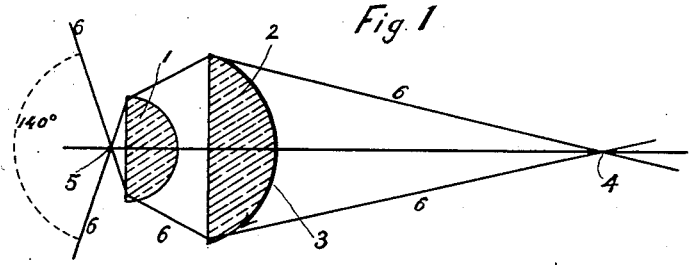
Figure 2:
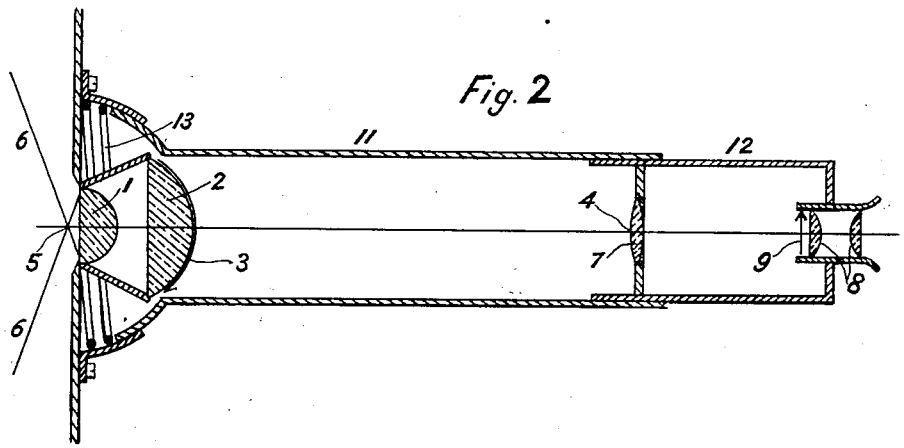
Figure 3:
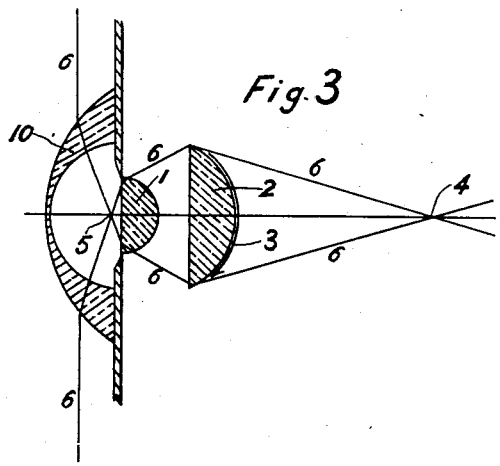
Figure 4:
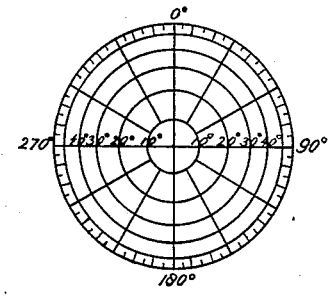

Fig. 1 shows a sighting objective providing a view of about 140°; Fig. 2 shows a complete operative sighting instrument provided with a telescope; Fig. 3 shows a sighting objective providing a view of about 180°; Fig. 4 shows a device to determine the location in a vaulted image field.

Considering the objects of the invention nearer we see in Fig. 1 a wide angle sighting objective composed of two substantially plano-convex lenses 1 and 2 of different size.

In this figure lens 1 is a hemispherical lens, the radius of which is taken=1. Its focal distance is, for ordinary crown glass, consequently about 1.9.

Lens 2, the radius of which may be=2 and its thickness=1.35, is spaced at such a distance from lens 1, that its rear surface coincides with the vaulted image plane 3 of lens 1.

There this reversed image clearly can be seen over its whole extent by the naked eye, placed at some distance behind it in or near the axis, for instance in point 4.

Fig. 1 shows the path of the outer main rays 6, forming the outer points of image 3 and continuing their course, like all other main rays, to point 4, the place of the pupil of the eye.

The pupil of the eye 4, being imaged by the two lenses at point 5, this latter point, lying at a short distance before lens 1, is to be considered as the center of the real working entrance pupil of the objective, the crossing point of all main rays covering in this example a field of view of about 140°.

Therefore the aperture in the wall, immediately behind which the objective is placed, need not be larger than the image of the eye pupil, but making the aperture larger, it affords accordingly more freedom to the eye to choose a place near the axis.

The above mentioned values and those concerning the following instruments represent merely ratios and executive examples for typical forms of the invention.

The image 3 of the objective shows the objects in a reversed position. If an erect image at a larger scale is desired the device shown in Fig. 2 can be used.

Behind the objective a tube 11 is mounted rotatably round point 5 and kept at its place by a strong spiral spring 13.

A second tube 12 containing a telescope, consisting of a telescopic objective 7 and an ocular 8, can be inserted telescopically in tube 11.

The telescopic objective 7 projects and erects a part of the image 3 in an image 9 at the ocular 8, in which it is seen magnified.

By rotating tube 11 successive parts of image 3 can be seen in this way.

The wideness of the view can be extended up to about 180° using a sighting objective as shown in Fig. 3, where a negative lens 10 is placed in front of lens 1.

This negative meniscus lens enables the rays, making angles of about 90° with the axis, to enter the objective, refracting them at every surface towards the axis, thus reducing the angle of 180° to less than 140° and forming in front of the objective a reduced virtual image, that is imaged on the rear surface of the rear lens 2.

The data for this device may be as follows:
Front radius of negative lens=4.
Inner radius of the same=2.
Space to front of lens 1=1.35.
Radius and thickness of lens 1=1.
Radius of lens 2=2.
Thickness of the same=1.35.
Space between lens 1 and 2=1.
Refraction index about 1.523.

To determine the location of the objects and their direction relative to the room or the instrument we can make use of marks, scales, lines or threads placed in the image plane 3, indicating angles, directions or the location of the objects within the field.

An example of these marks is shown in Fig. 4 to be used for a vaulted image plane and engraved on the rear surface of the rear lens 2, allowing to read the direction, in which an object is to be seen, by graduations on the edge and radial lines, its angular deviation from the axis of the instrument being indicated by concentric circles.

I claim:

1. A sighting instrument consisting of a tube, containing a wide angle sighting objective, composed of a substantially plano-convex lens, having the flattest plane in front and having a thickness of about once the radius of the convex surface, a second substantially plano-convex lens, having the flattest plane in front, the radius of the rear surface being substantially 2 times that of the front lens, its rear surface coinciding with the image plane of the preceding lens, the second lens having a thickness of about 1.35 times the radius of the front lens, a telescopic objective placed behind the second lens at a distance about two times its own focal length, projecting and erecting a part of the first reversed image near a field lens of an ocular and means for indicating the location of objects and their direction by marks in the plane of one of the images according to their distortion and curvature.

2. A sighting objective, composed of a substantially plano-convex front lens, having the flattest plane in front and having a thickness of about once the radius of the convex surface, a second substantially plano-convex lens, having the flattest plane in front, the radius of the rear surface being about 2 times that of the front lens, the second lens having a thickness of about 1.35 times the radius of the front lens, a negative meniscus lens in front of the first lens with radii about 4 and 2 times the radius of the first lens, spaced at about 1.35 times the radius of the first lens from that lens, the rear surface of the rear lens coinciding with the image plane of the preceding lenses and means for indicating the location of objects and their direction by marks on the rear surface of the rear lens, according to the distortion and curvature of the image.

LIEUWE E. W. VAN ALBADA.